United States Patent [19]
Kuok et al.

[11] Patent Number: 5,177,783
[45] Date of Patent: Jan. 5, 1993

[54] SWITCHING CIRCUIT IN A TELEPHONE DEVICE FOR SELECTING BETWEEN TWO-LINE AND KEYSYSTEM MODES OF OPERATION

[75] Inventors: Henry H. Kuok; John H. Livingston, both of Liverpool, N.Y.

[73] Assignee: Thomson Consumer Electronics, Inc.

[21] Appl. No.: 638,971

[22] Filed: Jan. 8, 1991

[51] Int. Cl.$^5$ .................... H04M 1/64; H04M 9/06
[52] U.S. Cl. ............................. 379/423; 379/165; 379/376
[58] Field of Search ............... 379/165, 20, 374, 376, 379/423

[56] References Cited
U.S. PATENT DOCUMENTS
3,419,684  12/1968  Lord et al. .................... 379/423

OTHER PUBLICATIONS
Advertisements for telephone answering machines having capability of answering two telephone lines—these machines are: the Panasonic KX-T2740, AT&T model 1532 & AT&T model 1332.

Primary Examiner—Stafford D. Schreyer

[57] ABSTRACT

In a telephone answering machine, means are provided for selecting one of three operating modes. In mode 1, the answering machine answers telephone calls connected via the tip and ring terminals, and does not place a low impedance across the A and A1 terminals. In mode 2, the answering machine answers calls connected via the tip and ring terminals, and places a low impedance across the A and A1 terminals. In mode 3, the answering machine answers telephone calls connected via the A and A1 terminals.

5 Claims, 1 Drawing Sheet

SWITCHING CIRCUIT IN A TELEPHONE DEVICE FOR SELECTING BETWEEN TWO-LINE AND KEYSYSTEM MODES OF OPERATION

FIELD OF THE INVENTION

The subject application concerns the field of telephone answering machines.

BACKGROUND OF THE INVENTION

Telephone answering machines for automatically answering a telephone, generating a prerecorded greeting message (i.e., outgoing announcement or OGA), and recording an incoming message are commonly available. Such an answering machine is known from the GE model no. 9882, manufactured by Thomson Consumer Electronics, Inc. Indianapolis, Ind. This answering machine is capable of answering telephone calls received via the "tip" and "ring" terminals, as is standard practice.

Telephone companies have been installing four-line cables to homes for quite some time. Two of the lines are the above-noted tip and ring lines and occupy the center terminals of the standard 4-pin modular plug. The other two lines are referred to as A and A1 respectively, and occupy the outer terminals of the standard 4-pin modular plug. Previously, the A and A1 lines were unused. However, telephone companies recently have begun using lines A and A1 to connect a second telephone line (i.e., central office or CO line) to private homes. Unfortunately, this new use for the A and A1 lines has created an incompatibility problem with respect to telephone answering machines, in that the A and A1 lines are also used in commercial offices for illuminating "line-in-use" lamps on business multiline telephones (i.e., keysystem units). That is, an answering machine designed for use with keysystem-compatible equipment will answer a telephone call on the tip and ring terminal pair, and place a low impedance across the A and A1 terminal pair to indicate that the line is in use. If such a keysystem-compatible answering machine is used at home, then the second telephone line (i.e., the one connected via the A and A1 lines) will be disabled by the automatically-connected low impedance, when the first telephone line is answered. If a non-keysystem-compatible answering machine is used in the office environment, then the telephone call will be answered, but undesirably, the line-in-use indication will not be provided.

A further problem exists in the home environment, in that a user may want to have his answering machine answer his second telephone line. A home answering machine which can answer either of two telephone lines is known from the Panasonic model KX-T2740. However, this model has two modular input jacks, and requires two separate telephone lines to be connected (i.e., it cannot not answer telephone calls connected via terminals A and A1 of the telephone cable without the use of an additional adapter to split the telephone lines onto separate cables). Known keysystem-compatible answering machines have no capability for answering telephone calls on the A and A1 lines.

SUMMARY OF THE INVENTION

In a telephone answering machine, means are provided for selecting one of three operating modes. In mode 1, the answering machine answers telephone calls connected via the tip and ring terminals, and does not place a low impedance across the A and A1 terminals. In mode 2, the answering machine answers calls connected via the tip and ring terminals, and places a low impedance across the A and A1 terminals. In mode 3, the answering machine answers telephone calls connected via the A and A1 terminals.

BRIEF DESCRIPTION OF THE DRAWING

The sole FIGURE shows, in schematic form, a telephone system interface circuit comprising a switch arrangement in accordance with the subject invention, in the environment of a telephone answering machine.

DETAILED DESCRIPTION OF THE EMBODIMENT

Figure 1:
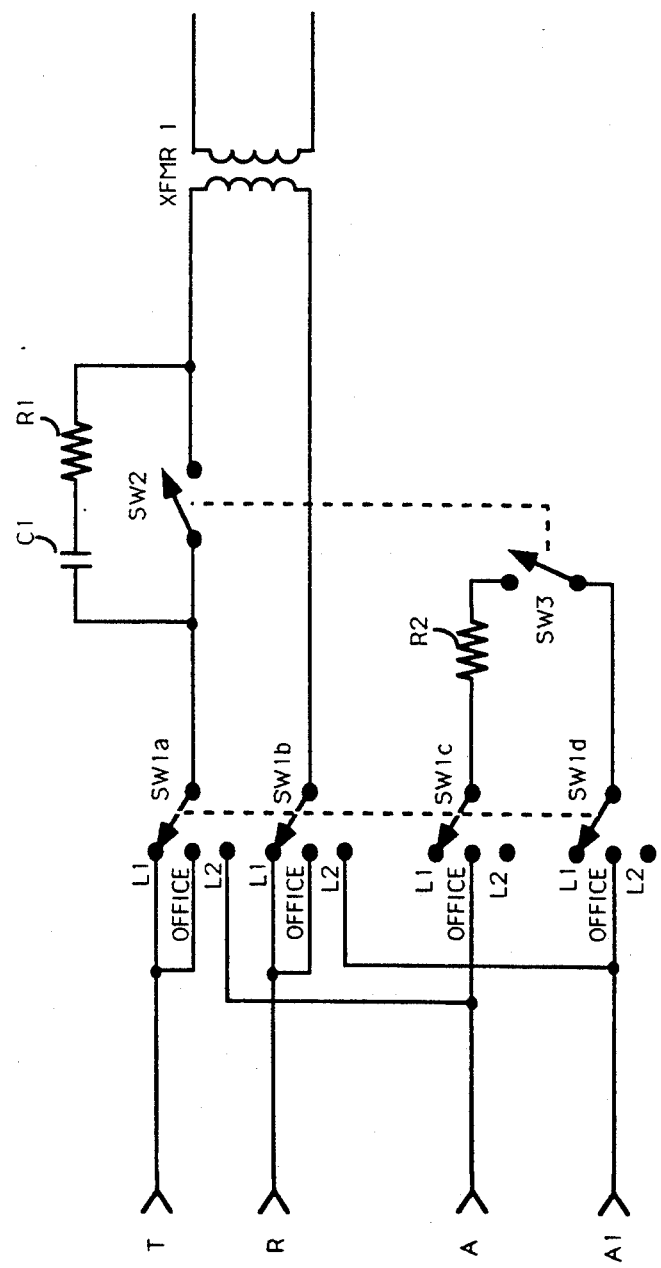

The subject invention will be described with reference to the sole FIGURE, which shows a portion of an interface circuit for connecting a device such as a telephone answering machine to two pairs of telephone lines. The connection to the telephone lines is made at terminals T (tip) and R (ring), and at terminals A and A1. The connections to the above-mentioned terminals are made via the contacts of a 4-pole 3-position (4P3T) slide switch SW1, the operation of which will be described in detail below. Relay contacts SW2 are shown in the open position. When a telephone call is answered by the answering machine, relay contacts SW2 close, thus connecting the answering machine to the telephone line. A high pass network comprising a capacitor C1 and a resistor R1 couples the ringer signal around the normally open switch contacts of relay contacts SW2. A transformer XFMR 1 couples audio signals and provides isolation between the telephone line and the answering machine. A second set of relay contacts SW3 is arranged to operate simultaneously with relay contacts SW2, and when operated connects a low impedance device such as resistor R2 across the wiper (i.e., movable) contacts of segments SW1c and SW1d of switch SW1.

Switch SW1 allows the selection of one of three modes of operation. The first mode is selected when switch SW1 is placed in the LINE 1 (L1) position. In this mode switch segments SW1a and SW1b connect the answering machine to answer telephone calls received at the tip (T) and ring (R) terminals, and switch segments SW1c and SW1d isolate the low impedance of resistor R2 from the A and A1 terminals. With this switch selection, telephone line 1 is connected to be answered by the answering machine and telephone line 2 is not disabled. The second mode of operation is selected when switch SW1 is placed in the OFFICE position. In this mode switch segments SW1a and SW1b connect the answering machine to answer telephone calls received at the tip (T) and ring (R) terminals, and switch segments SW1c and SW1d connect the low impedance of resistor R2 to the A and A1 terminals to provide a line-in-use indication. The termination of the A and A1 lines in a low impedance for signalling line-in-use is known per se. The third mode of operation is selected when switch SW1 is placed in the LINE 2 (L2) position. In this mode switch segments SW1a and SW1b connect the answering machine to answer telephone calls received at the A and A1 terminals, and switch segments SW1c and SW1d isolate the low impedance of resistor R2 from the A and A1 terminals.

A telephone answering machine interface has thus been described which, via a user-operable switch, is compatible with both commercial office telephone connections, and home one and two line connections.

What is claimed is:

1. A telephone answering machine interface circuit for selecting between two-line and keysystem modes of operation, comprising:

a first input terminal pair for receiving input signals from a first telephone line;

a second input terminal pair for one of receiving input signals from a second telephone line and signaling line-in-use to a line-in-use display circuit;

means having a first and second input coupled to said first and second input terminal pairs respectively for selectively coupling ones of said pairs to a first and second output in one of a first, second, and third mode of operation, wherein in said first mode of operation said selection means couples said first terminal pair to said first output and does not couple said second terminal pair to said second output, in said second mode of operation said selection means couples said first terminal pair to said first output and couples said second terminal pair to said second output for causing a display of line-in-use, and in said third mode of operation said selection means couples said second terminal pair to said first output.

2. The circuit of claim 1 wherein said selection means is a four-pole three-position switch.

3. A telephone answering machine interface circuit for selecting between two-line and keysystem modes of operation, comprising:

a first input terminal pair for receiving input signals from a first telephone line;

a second input terminal pair for one of receiving input signals from a second telephone line and terminating a cable pair coupled to said second input terminal pair in a low impedance for signaling line-in-use to a line-in-use display circuit;

selection means having a first and second input coupled to said first and second input terminal pairs respectively for selectively coupling ones of said pairs to a first and second output in one of a first, second, and third mode of operation, wherein in said first mode of operation said selection means selects said first telephone line and does not terminate said second terminal pair in said low impedance, in said second mode of operation said selection means selects said first telephone line and terminates said second terminal pair in said low impedance for causing a display of line-in-use, and in said third mode of operation said selection means selects said second telephone line.

4. The circuit of claim 3 wherein said selection means is a four-pole three-position switch.

5. The circuit of claim 4 wherein said first telephone line and one of said second telephone line and said cable pair are connected via a single four terminal plug.

* * * * *